(12) United States Patent
Jensen et al.

(10) Patent No.: US 10,358,770 B2
(45) Date of Patent: Jul. 23, 2019

(54) METHOD FOR MAKING SUSPENSION CABLE TO DESIRED LENGTH (71) Applicant: Caterpillar Inc., Peoria, IL (US)

(72) Inventors: Jeff A. Jensen, Dunlap, IL (US); Christopher Robert Wanasek, Norway, WI (US); Carl Delbert Gilmore, South Milwaukee, WI (US); Jeffrey Ryan Asman, Tucson, AZ (US); Randy Tyler Ross, Peoria, IL (US); James Leigh Gill, New Berlin, WI (US); Joseph Jeffery Every, Peoria, IL (US); Joseph Anthony Rapp, Vail, AZ (US); Brian F. Weber, Tucson, AZ (US)

(73) Assignee: Caterpillar Inc., Deerfield, IL (US)

(*) Notice: Subject to any disclaimer, the term of this patent is extended or adjusted under 35 U.S.C. 154(b) by 121 days.

(21) Appl. No.: 15/665,901

(22) Filed: Aug. 1, 2017

(65) Prior Publication Data
US 2019/0040575 A1    Feb. 7, 2019

(51) Int. Cl.
B21F 9/00      (2006.01)
F16G 11/00     (2006.01)
D07B 5/00      (2006.01)
D07B 7/02      (2006.01)
E02F 3/32      (2006.01)

(52) U.S. Cl.
CPC ............... *D07B 7/02* (2013.01); *D07B 5/00* (2013.01); *B21F 9/00* (2013.01); *B21F 9/007* (2013.01); *E02F 3/32* (2013.01); *F16G 11/00* (2013.01)

(58) Field of Classification Search
CPC ...... D07B 2401/408; D07B 7/02; D07B 5/00; F16G 11/00; E02F 3/32; B21F 9/00; B21F 9/007
See application file for complete search history.

(56) References Cited

U.S. PATENT DOCUMENTS

| 3,337,927 A | * | 8/1967 | Dresie | ........................ B21F 9/00 24/132 R |
| 8,607,417 B2 | | 12/2013 | Naquin et al. | |
| 2014/0090279 A1 | | 4/2014 | Campbell | |

* cited by examiner

*Primary Examiner* — Christopher J Besler (57) ABSTRACT

A method for making a suspension cable to a desired length is provided. The method includes providing an initial pin hole on a tab of a socket associated with the cable. The method includes stretching the cable to a desired percentage of a rated breaking strength of the cable. The method includes measuring a length of the cable. The method includes determining a position of a final pin hole to be formed on the tab based on the measured length of the cable and a predefined tolerance. The method includes creating the final pin hole at the determined position.

6 Claims, 9 Drawing Sheets

METHOD FOR MAKING SUSPENSION CABLE TO DESIRED LENGTH

TECHNICAL FIELD

The present disclosure relates to a suspension cable, and more particularly to a method for making the suspension cable to a desired length.

BACKGROUND

Machines, for example rope shovels and draglines, have suspension cables that are provided on the machine. For example, in case of the rope shovel, the suspension cables may run from a top portion of the machine to an end of a boom of the machine.

The suspension cables used in these applications may be approximately 176 feet in length. Very tight tolerances are required for the suspension cables to be used in such environments. For example, for the suspension cable having the length of approximately 176 feet, the tolerance required may be less than 1 inch. However, current methods and systems provide higher tolerances, that may not be desirable.

United States Published Application Number 2014/0090279 describes an assembly method for using a flexible tensile member as part of the rigging for a dragline bucket. The tensile member includes a stranded core surrounded by one or more armoring layers or devices. The stranded core produces excellent strength in tension. The armor layer(s) provides a lower but still sufficient strength in compression. The compression strength is sufficient to eliminate plastic deformation of the core strands when the tensile member is bent around or dragged across an edge. The armor layer(s) also protects against battering, cutting, abrading, compression, and shearing forces. This resistance greatly reduces the likelihood of heavy items—such as the yoke, dump block, and spreader bar-damaging the tensile member when the bucket assembly is laid on the ground.

SUMMARY OF THE DISCLOSURE

In one aspect of the present disclosure, a method for making a suspension cable to a desired length is provided. The method includes providing an initial pin hole on a tab of a socket associated with the cable. The method includes stretching the cable to a desired percentage of a rated breaking strength of the cable. The method includes measuring a length of the cable. The method includes determining a position of a final pin hole to be formed on the tab based on the measured length of the cable and a predefined tolerance. The method includes creating the final pin hole at the determined position.

In another aspect of the present disclosure, a method for making a suspension cable to a desired length is provided. The method includes providing an undersized hole on a tab of a socket associated with the cable. The method includes stretching the cable to about 20% of a rated breaking strength of the cable. The method includes measuring a length of the cable. The method includes determining a position of a final pin hole to be formed on the tab based on the measured length of the cable and a predefined tolerance. The method includes machining the socket to form the final pin hole at the determined position.

In yet another aspect of the present disclosure, a method for making a suspension cable to a desired length is provided. The method includes providing an oversized hole on a tab of a socket associated with the cable. The method includes stretching the cable to about 20% of a rated breaking strength of the cable. The method includes measuring a length of the cable. The method includes determining a position of a final pin hole to be formed on the tab based on the measured length of the cable and a predefined tolerance. The method includes providing an insert having a predefined hole within the oversized hole of the socket to form the final pin hole at the determined position.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
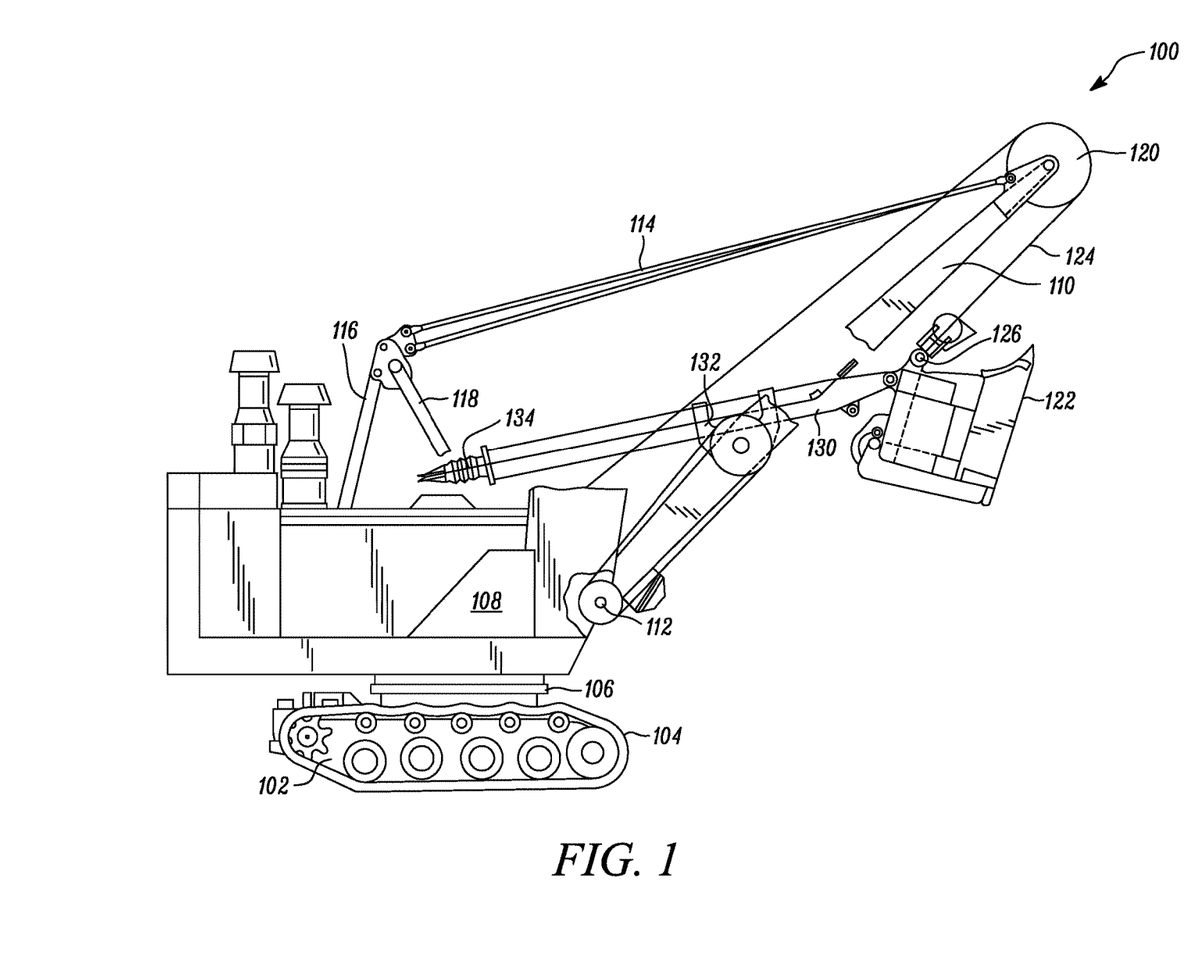
FIG. 1 is a side view of an exemplary machine, according to various concepts of the present disclosure.

Referring to FIG. 1, an exemplary machine 100 is illustrated. The machine is embodied as a rope shovel. The machine 100 comprises a mobile base 102 supported on drive tracks 104, and having supported thereon through a turntable 106, a platform in the form of a machinery deck 108. The turntable 106 permits full 360 degrees of rotation of the machinery deck 108 relative to the base 102. A boom 110 is pivotally connected at a first end 112 to the machinery deck 108. The boom 110 is held in an upwardly and outwardly extending relation to the deck 108 by a brace in the form of suspension cables 114, hereinafter referred to as cables 114, which are anchored to a back stay 116 of a stay structure 118 rigidly mounted on the machinery deck 108. A sheave 120 is rotatably mounted on the upper end of the boom 110.

The dipper 122 is suspended from the boom 110 by a hoist cable 124 wrapped over the sheave 120 and attached to the dipper 122 at a bail pin 126. The machine structure is movable to locate the dipper 122 in respective loaded and unloading positions. And the hoist cable 124 is anchored to a winch drum (not shown) mounted on the machinery deck 108. As the winch drum rotates, the hoist cable 124 is either paid out or pulled in, lowering or raising the dipper 122. The dipper 122 has an arm (also known as a handle) 130 rigidly attached thereto, with the dipper arm 130 supported in a saddle block 132, this allows axial and rotational movement. The saddle block 132, is pivotally mounted on the boom 110. The dipper arm 130 has an optional rope crowd or hydraulic cylinder (hydracrowd) configuration. The crowd motion is driven by an electric motor and transmission (not shown) to effect extension or retraction of the dipper arm 130 relative to the saddle block 132.

A source of electrical power (not shown) is mounted on the machinery deck 108 to provide power to one or more hoist electric motors (not shown) that drives the winch drum, a crowd electric motor (not shown) that drives the crowd rope or hydraulic cylinder head end 134, and a swing electric motor (not shown) that turns the turntable 102. The above-described basic construction of the rope shovel is widely known and used and further details of the construction are not provided, as they are well known in the art.

Figure 2:
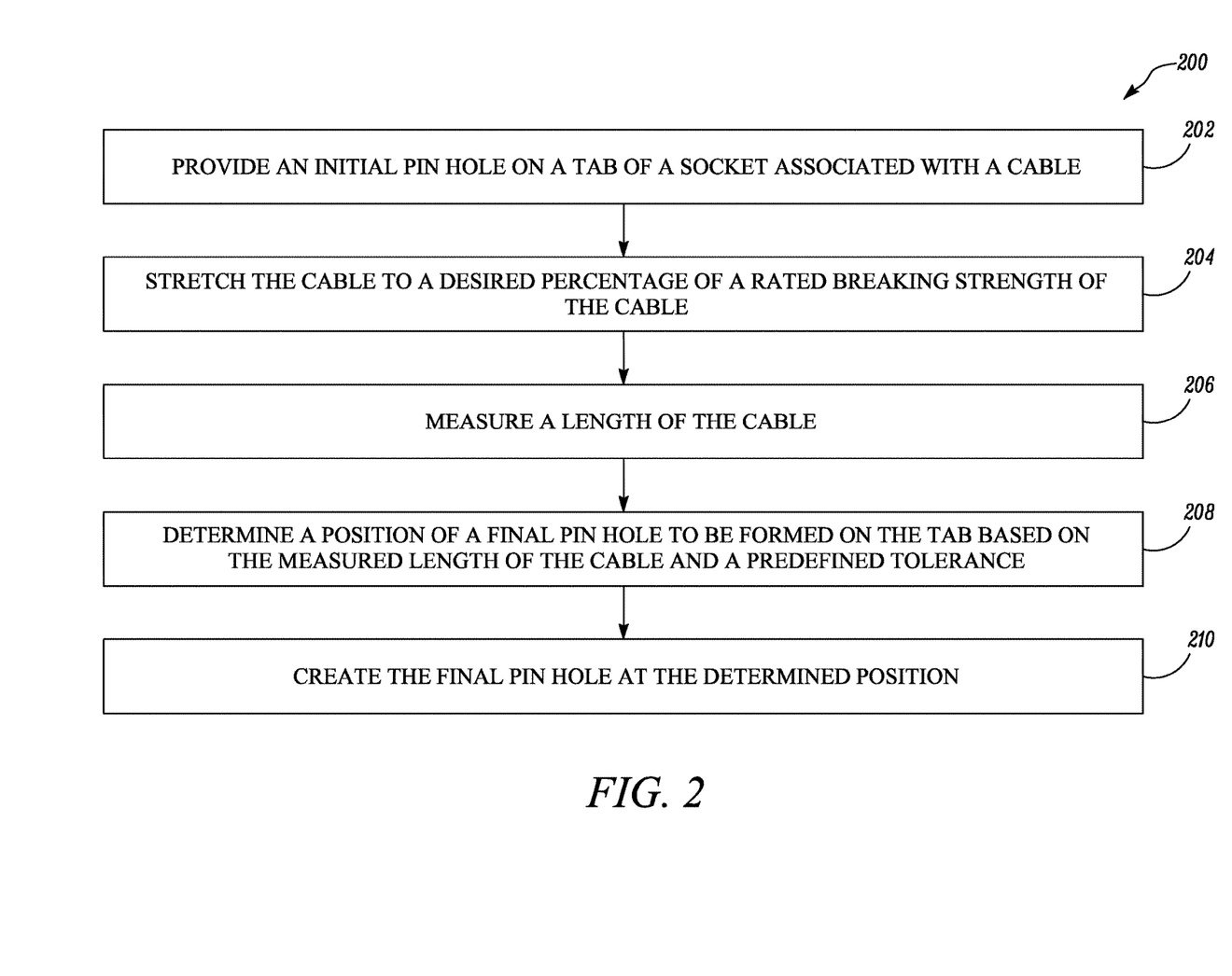
FIG. 2 is a flowchart of a method of making a suspension cable for the machine of FIG. 1, according to various concepts of the present disclosure.
Figure 3:
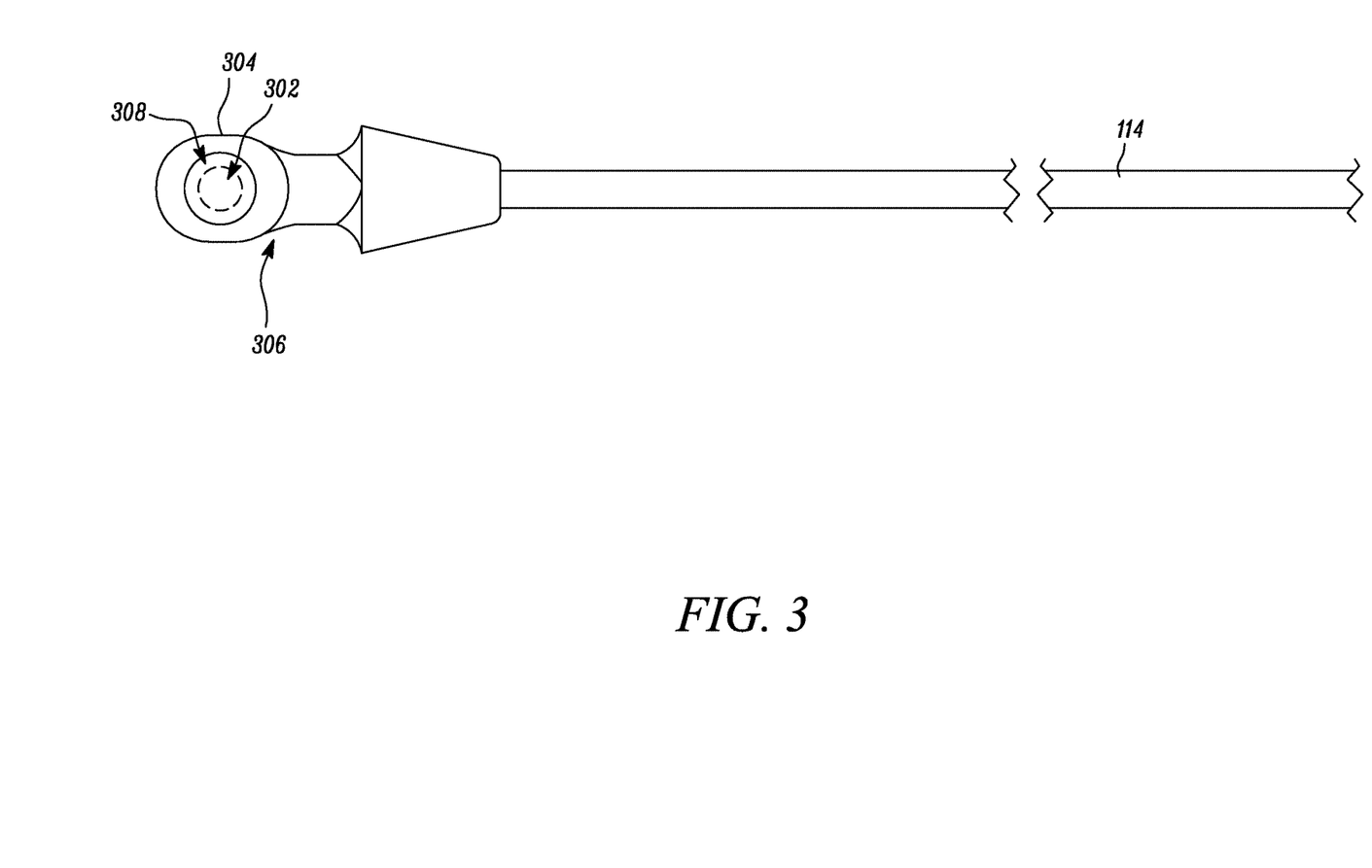
FIG. 3 is a schematic view of the suspension cable having a socket, according to various concepts of the present disclosure.

The present disclosure relates to a system and method of making the cable 114 to a desired length. Referring to FIGS. 2 and 3, at step 202, the method 200 includes providing an initial pin hole 302 on a tab 304 of a socket 306 associated with the cable 114. In one embodiment, the initial pin hole 302 may be provided on the socket 306 according to a method 400 described in connection with FIG. 4 later in this section. In another embodiment, the initial pin hole 302 may be provided on the socket 306 according to a method 600 described in connection with FIG. 6 later in this section. At step 204, the cable 114 is stretched to a desired percentage of a rated breaking strength of the cable 114. For example, the desired percentage of the rated breaking strength is 20%. The desired percentage may be estimated based on a standard load that the cable 114 is expected to operate at. For example, a 5:1 ratio may exist between a loading capacity of the cable 114 and the standard load that the cable 114 is expected to be loaded at during operation. This ratio may vary based on the application, accordingly leading to a change in the percentage.

At step 206, a length of the cable 114 is measured using known methods. For example, a measuring tape may be used to measure the length of the cable 114. Alternatively, a laser system may be used to measure the length of the cable 114. At step 208, a position of a final pin hole 308 to be formed on the tab 304 may be determined based on the measured length of the cable 114 and a predefined tolerance. In one example, for the cable 114 having the length of approximately 176 feet, the predefined tolerance is less than 2 inches, in another example, for the cable 114 having the length of approximately 176 feet, the predefined tolerance is less than 1 inch. In yet another example, for the cable 114 having the length of approximately 176 feet, the predefined tolerance is approximately 0.125 inches. Further, at step 210, the final pin hole 308 is created at the determined position using known machining techniques.

Figure 4:
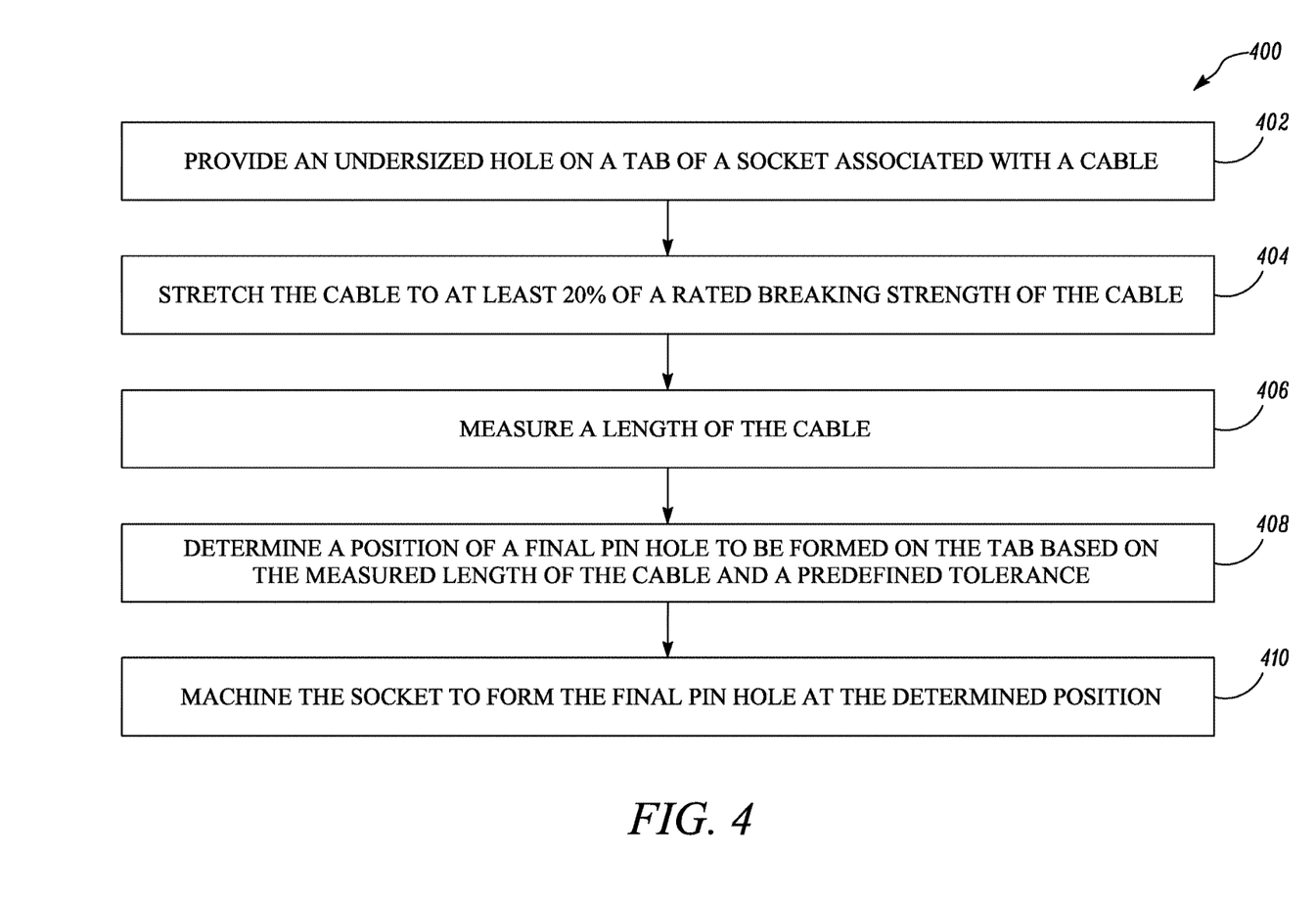
FIG. 4 is a flowchart of a first method for making the suspension cable to a desired length, according to various concepts of the present disclosure.
Figure 5:
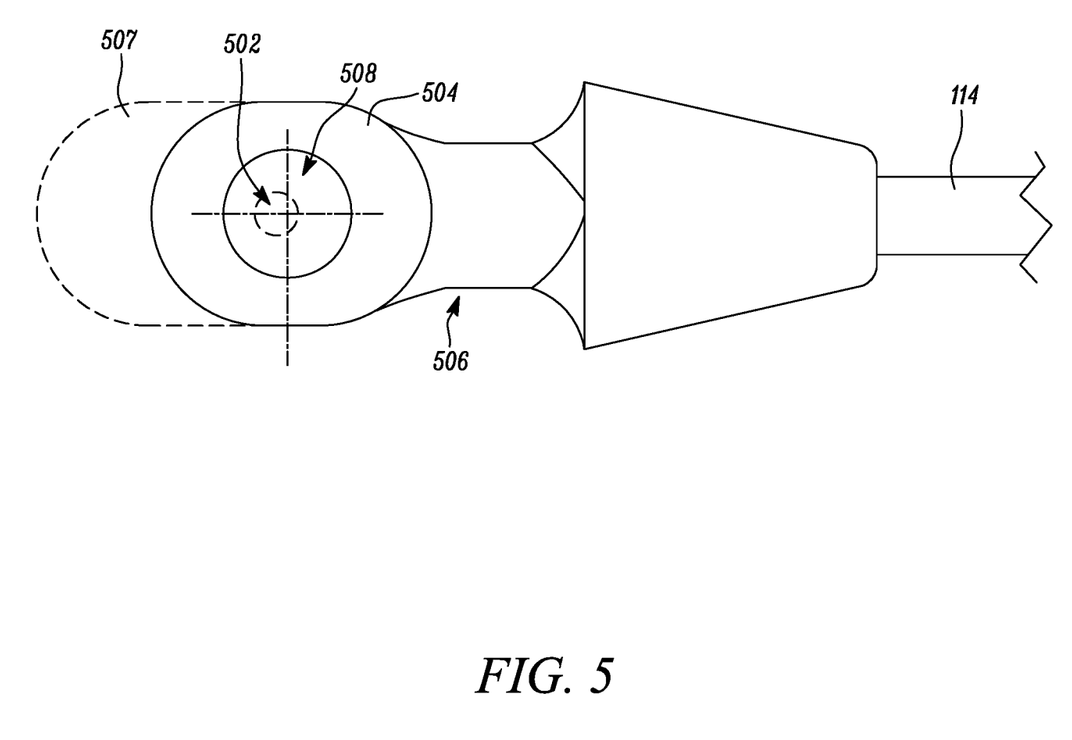
FIG. 5 is a schematic of a socket having an extended length and an undersized hole, according to various concepts of the present disclosure.

Referring to FIGS. 4 and 5, one of the methods of making the cable 114 to desired length will be explained in detail. At step 402, an undersized hole 502 is provided on a tab 504 of a socket 506 of the cable 114. The location of the undersized hole may be based on number of factors related to the cable 114, including material used to thrill the cable 114, dimensions or design of the cable 114, material properties of the cable 114 for example bulk modulus of the cable 114, and so on. In some cases, initially a length of the tab 504 of the socket 506 is extended prior to providing the undersized hole 502 (see portion 507). The cable 114 is then fixedly attached within the socket 506. For example, the socket 506 may contain a tapering cavity which is filled with an adhesive. One end of the cable 114 is frayed and then introduced into the tapering cavity for attaching the cable 114 within the socket 506.

Thereafter, at step 404, the cable 114 is stretched to about 20% of the rated breaking strength of the cable 114. The cable 114 is stretched using known techniques. For example, a bar is passed through the undersized hole 502 and a force is exerted on the socket 506 and the cable 114, causing the cable 114 to be stretched to approximately 20% of the rated breaking strength of the cable 114, Alternatively, other methods may be used to stretch the cable 114.

At step 406, the length of the cable 114 is measured using known techniques. For example, using a measuring tape or laser system. At step 408, a position of a final pin hole 508 to be formed on the tab 504 of the socket 506 may be determined based on the measured length of the cable 114 and the predefined tolerance. In one example, for the cable 114 having the length of approximately 176 feet, the predefined tolerance is less than 2 inches. In another example, for the cable 114 having the length of approximately 176 feet, the predefined tolerance is less than 1 inch. In yet another example, for the cable 114 having the length of approximately 176 feet, the predefined tolerance is approximately 0.125 inches. Accordingly, based on the length of the cable 114 after stretching and the predefined tolerance, the position of the final pin hole 508 to be formed on the tab 504 of the socket 506 is determined. After the position of the final pin hole 508 is determined the load may be removed so that the cable 114 and socket 506 may be transported to a location at which final machining may be done.

This position is marked on the tab 504 of the socket 506. Further, at step 410, the tab 504 of the socket 506 is machined to form the final pin hole 508 at the determined position. The machining may involve increasing the size of the undersized hole 502 so that the final pin hole 508 is formed at the determined position and is of a diameter based on a thickness of the cable 114. Further, in some cases, a portion of the extended length of the tab 504 may be removed by machining.

Figure 6:
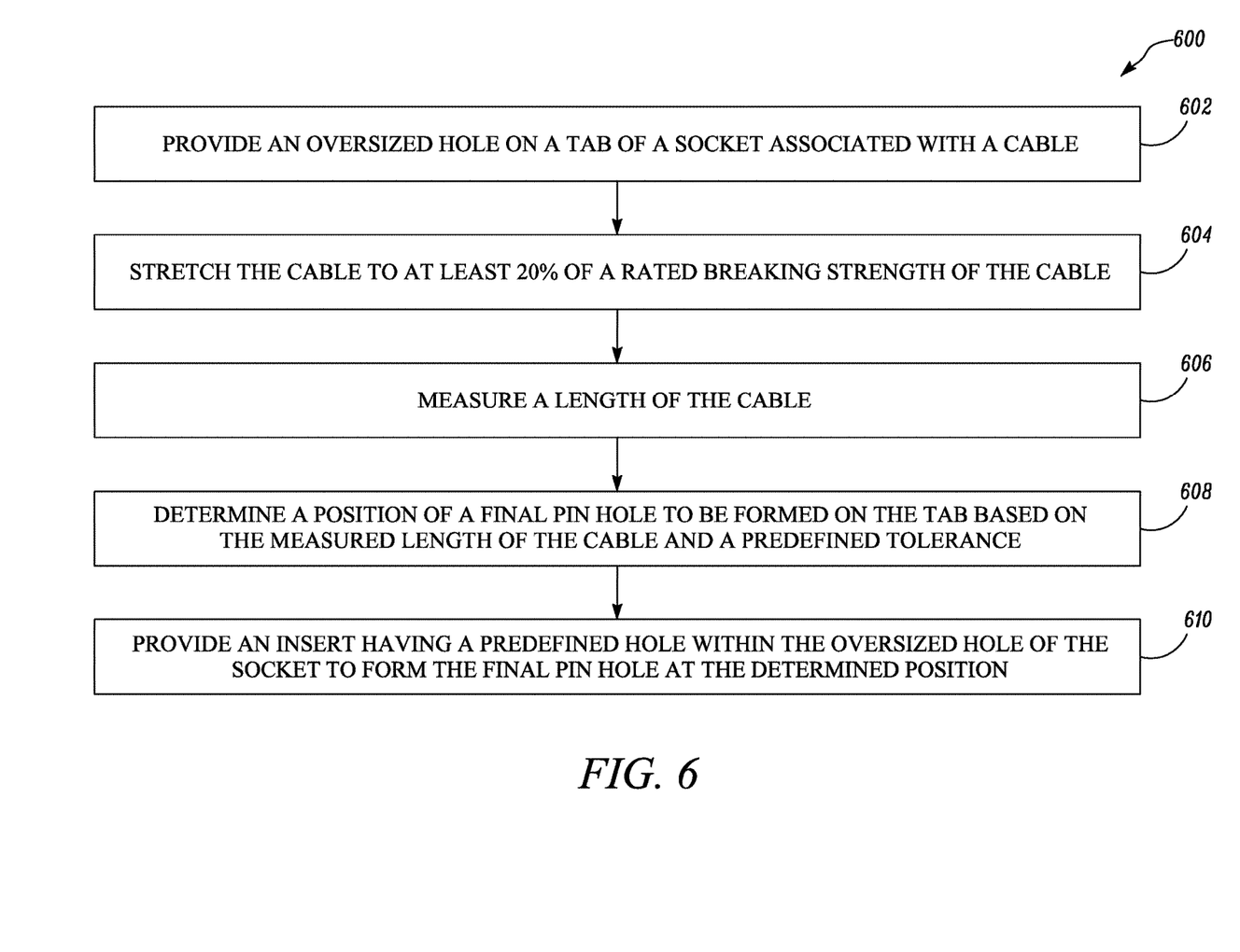
FIG. 6 is a flowchart of a second method for making the suspension cable to a desired length, according to various concepts of the present disclosure.
Figure 7:
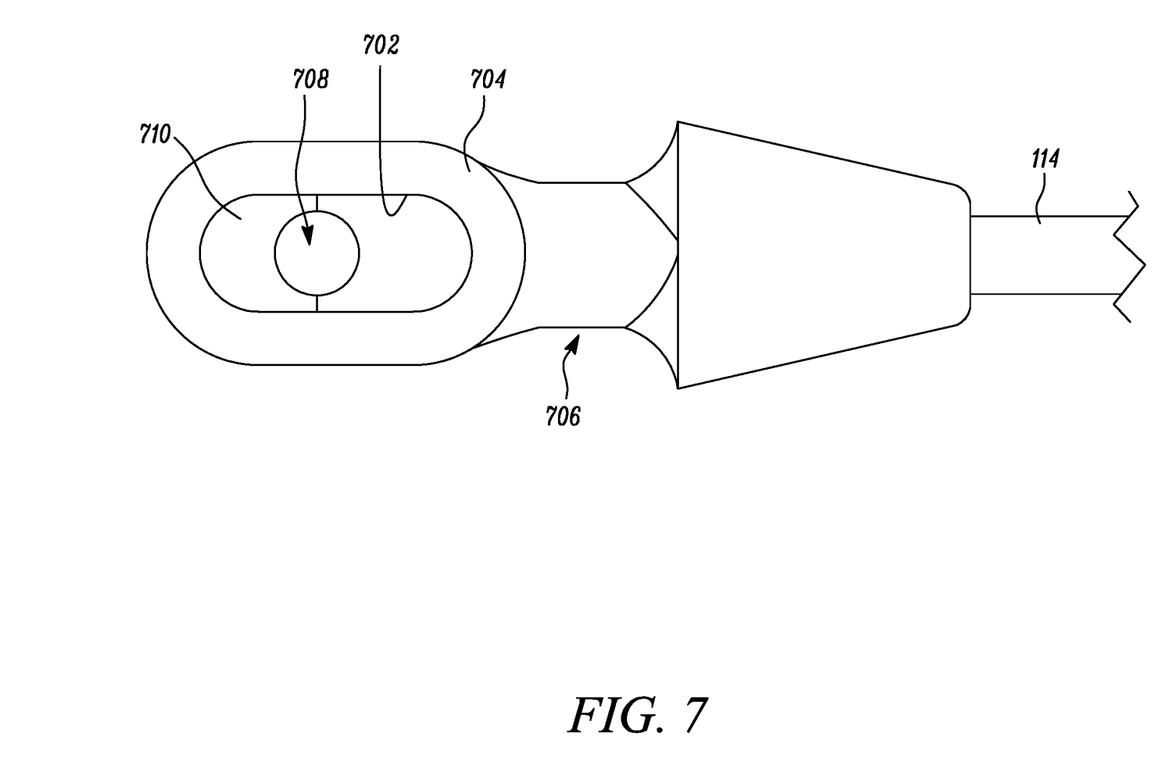
FIG. 7 is a schematic of a socket having an extended length and an oversized hole, according to various concepts of the present disclosure.

Referring to FIGS. 6 and 7, another method of making the cable 114 to desired length will be explained in detail. At step 602, an oversized hole 702 is provided on a tab 704 of a socket 706 of the cable 114. In some cases, initially a length of the tab 704 of the socket 706 is extended prior to providing the oversized hole 702. The cable 114 is then fixedly attached within the socket 704. For example, the socket 704 may contain a tapering cavity (not shown) which is filled with an adhesive. One end of the cable 114 is frayed and the introduced into the tapering cavity for attaching the cable 114 within the socket 704.

Thereafter, at step 604, the cable 114 is stretched to about 20% of the rated breaking strength of the cable 114. The cable 114 is stretched using known techniques. For example, a clamping tool may be used to hold the tab 704 of the socket 706 while a force is exerted on the socket 706 and the cable 114 attached thereto for stretching the cable 114. Alternatively, other methods may be used to stretch the cable 114. The clamping tool is a "split collet" type of fixture that clamps onto an outer diameter of the socket 706. A pulling three is applied on the cable 114 for stretching the cable 114.

At step 606, the length of the cable 114 is measured using known techniques. For example, using a measuring tape or laser system. At step 608, a position of a final pin hole 708 to be formed on the tab 704 of the socket 706 may be determined based on the measured length of the cable 114 and the predefined tolerance. In one example, for the cable 114 having the length of approximately 176 feet, the predefined tolerance is less than 2 inches. In another example, for the cable 114 having the length of approximately 176 feet, the predefined tolerance is less than 1 inch. In yet another example, for the cable 114 having the length of approximately 176 feet, the predefined tolerance is approximately 0.125 inches. Accordingly, based on the length of the cable 114 after stretching and the predefined tolerance, the position of the final pin hole 708 to be formed on the tab 704 of the socket 706 is determined. After the position of the final pin hole 708 is determined the load may be removed so that the cable 114 and socket 706 may be transported to a location at which final machining may be done.

This position is marked on the tab of the socket. Further, at step 610, an insert 710 having a predefined hole (that forms the final pin hole 708) is provided within the oversized hole 702 of the socket 706 to form the final pill hole 708 at the determined position. In one example, the insert 710 may be selected of inserts. Each insert in the set of inserts has a predefined hole provided at locations that are offset to the predefined holes provided on the other insets of the set. Thus, attachment of different inserts from the set of inserts will cause the final pin hole 708 to move by the offset distance, when attached within the oversized hole 702. In one example, the insert 710 may be reversed. By changing the orientation of the insert 710, the relative position of the predefined hole (and hence the final pin hole 708) with respect to the tab 704 may be shifted by a fixed distance. The insert 710 is chosen and/or the side of the insert 710 is selected from the set of inserts based on the determined position of the final pin hole 708.

The insert 710 is shown to have a two-piece design. Alternatively, the insert 710 may have a single piece design. In some cases, the insert 710 may have a multipiece design. The insert 710 may be fixedly attached within the oversized hole 702, such that an outer periphery of the insert 710 is in contact with a circumference of the oversized hole 702, using known attachment methods. For example, an adhesive may be used to attach the insert 710 within the oversized hole 702 of the tab 704. Further, in some cases, a portion of an extended length of the tab 704 may be removed by machining.

The socket 506, 706 is provided at each of the two ends of the cable 114. In one example, a pin hole is formed on any one of the two sockets and the above described methods may be used to provide the final pin hole 508, 708 on the other of the two sockets. The cable 114 is a synthetic rope. Further, although the cable 114 is described as being used in connection with the rope shovel, the cable 114 may alternatively be used on a dragline, guyed tower, suspension bridge, a radio tower, or a cellular tower.

Figure 8:
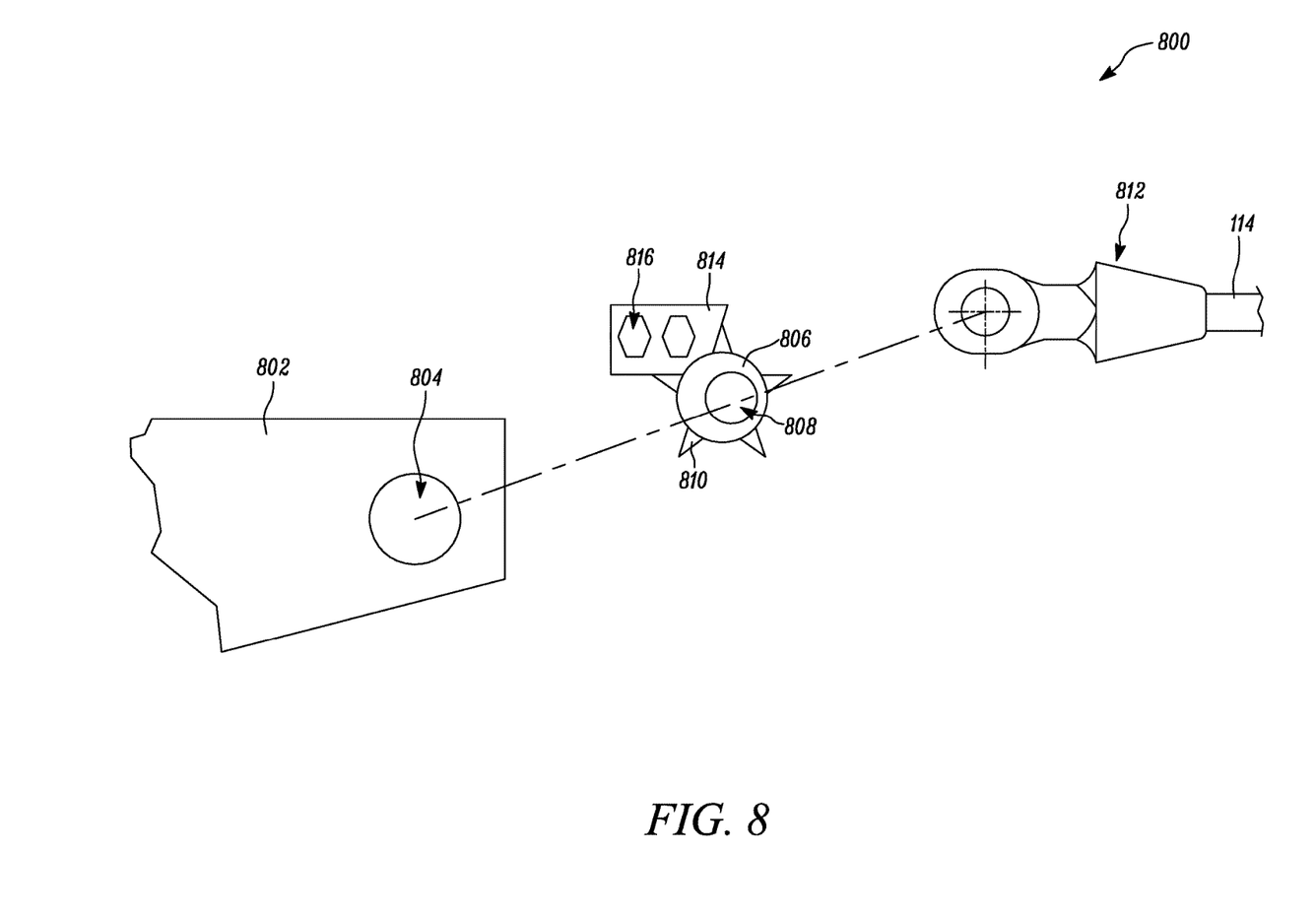
FIG. 8 is a schematic view of a first cam holding pin mechanism for the suspension cable, according to various concepts of the present disclosure.
Figure 9:
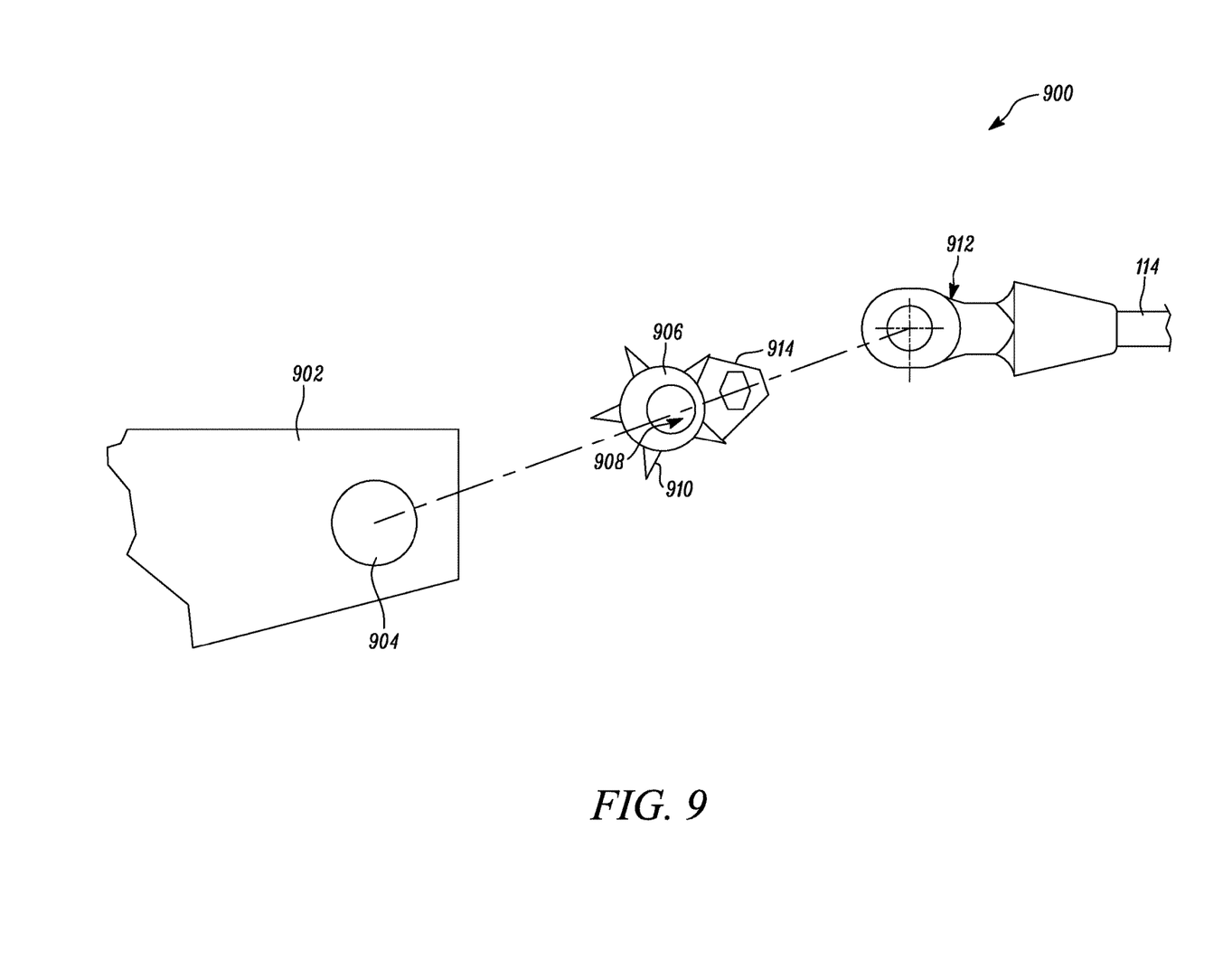
FIG. 9 a schematic view of a second cam holding pin mechanism for the suspension cable, according to various concepts of the present disclosure.

Referring to FIGS. 8 and 9, provides a first and a second cam holding pin mechanism 800, 900 respectively for the cable 114 for sharing load between two sockets of the system. A mainframe 802 of the machine 100 includes an oversized hole 804. The cam 806 has a cylindrical shape. The cam 806 is provided within the oversized hole 804. An offset hole 808 is provided in the cam 806. The cam 806 also includes teeth 810 provided on an outer surface of the cam 806. The cam 806 is capable of rotational motion about a central axis. A socket 812 of the cable 114 is provided through the cam 806. As the cam 806 rotates, the length of the cable 114 may be adjusted.

A retainer plate 814 is also provided. The retainer plate 814 includes a number of apertures 816. The retainer plate 816 is configured to engage with the teeth 810 provided on the cam 806. The retainer plate 814 can be bolted to the mainframe 802 to prevent the cam 806 from rotating. A pin (not shown) may be passed through the socket 812 and the cam 806. The cam holding pin mechanism 800 is provided on both sides of the mainframe 802, in one example, the cam holding pin mechanism 800 may be used on one or both ends of the cable 114, based on a required degree of adjustment.

FIG. 9 illustrates another cam holding pin mechanism 900. A mainframe 902 of the machine 100 includes an oversized hole 904 for receiving a cylindrical cam 906. The cam 906 includes an offset hole 908 and a number of teeth 910 that are provided on an outer surface. A retainer plate 914 is configured to engage with the teeth 910 provided on the cam 906. In this case, the retainer plate 914 is bolted to a pin hole of a socket 912 that is attached to the cable 114, using a phantom bolt. The retainer plate 914 is also bolted to the mainframe 902 of the machine 100. A pin (not shown) may be passed through the socket 912 and the cam 906. The cam holding pin mechanism 900 is provided on one side of the mainframe 902.

The cam holding pin mechanisms 800, 900 may be used to adjust for an added tolerance of the cable 114. The cam holding pin mechanisms 800, 900 may allow for more generous tolerance on the cable 114, while still being able to share the load between the two sockets of the system.

INDUSTRIAL APPLICABILITY

The methods described above provide an easy and effective way of making the cable 114 to the desired length and tolerance. Specifically, in applications, such as on the rope shovel, dragline, suspension bridge, guyed tower, radio or cellular tower, which require very tight tolerances, the above given methods may be utilized.

The solution explained herein allows tighter length tolerance for the cable 114 and ensures that every cable 114 in the system meets the required length tolerance. Further, the solution allows for individual cables to be replaced in the field instead of in matched sets, adding to ease in replacement and serviceability.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for making a suspension cable to a desired length, the method comprising:
    providing an initial pin hole on a tab of a socket attached to an end of the cable;
    stretching the cable to a desired percentage of a rated breaking strength of the cable;
    measuring a length of the stretched cable;
    determining a position of a final pin hole to be formed on the tab based on the measured length of the stretched cable and a predefined tolerance; and
    creating the final pin hole at the determined position.

2. The method of claim 1, wherein the initial pin hole is an undersized hole.

3. The method of claim 2, wherein creating the final pin hole includes the step of machining the socket to form the final pin hole at the determined position.

4. The method of claim 1, wherein the initial pin hole is an oversized hole.

5. The method of claim 4, wherein creating the final pin hole includes the step of providing an insert having a predefined hole within the oversized hole of the socket to form the final pill hole at the determined position.

6. The method of claim 1, wherein the desired percentage is about 20%.

* * * * *